United States Patent
Eckl et al.

(10) Patent No.: US 11,703,057 B2
(45) Date of Patent: Jul. 18, 2023

(54) CONTROL METHOD FOR MACHINE WITH INVERTER-OPERATED ELECTRIC DRIVE UNIT

(71) Applicant: KSB SE & Co. KGaA, Frankenthal (DE)

(72) Inventors: Martin Eckl, Frankenthal (DE); Jochen Schaab, Frankenthal (DE); Joachim Schullerer, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 0 days.

(21) Appl. No.: 17/265,121

(22) PCT Filed: Jul. 18, 2019

(86) PCT No.: PCT/EP2019/069402
§ 371 (c)(1),
(2) Date: Feb. 1, 2021

(87) PCT Pub. No.: WO2020/025344
PCT Pub. Date: Feb. 6, 2020

(65) Prior Publication Data
US 2021/0310494 A1 Oct. 7, 2021

(30) Foreign Application Priority Data
Aug. 2, 2018 (DE) ............. 10 2018 212 876.6

(51) Int. Cl.
*F04D 15/00* (2006.01)
*F04D 13/06* (2006.01)
*H02P 27/06* (2006.01)

(52) U.S. Cl.
CPC ......... *F04D 15/0066* (2013.01); *F04D 13/06* (2013.01); *H02P 27/06* (2013.01)

(58) Field of Classification Search
CPC ...... F04D 13/06; F04D 15/0066; H02P 27/06; H02P 27/08
See application file for complete search history.

(56) References Cited

U.S. PATENT DOCUMENTS

| | | | |
|---|---|---|---|
| 2013/0164146 A1* | 6/2013 | Ahola | G05B 13/02 417/18 |
| 2013/0320762 A1 | 12/2013 | Trudel et al. | |
| 2016/0359423 A1* | 12/2016 | Ohta | H02M 5/458 |

FOREIGN PATENT DOCUMENTS

| | | | |
|---|---|---|---|
| DE | 195 25 887 A1 | 1/1997 | |
| DE | 1952887 A1 * | 1/1997 | ............. F24D 19/10 |

(Continued)

OTHER PUBLICATIONS

International Search Report (PCT/ISA/210) issued in PCT Application No. PCT/EP2019/069402 dated Oct. 24, 2019 with English translation (five (5) pages).

(Continued)

*Primary Examiner* — Philip E Stimpert
(74) *Attorney, Agent, or Firm* — Crowell & Moring LLP

(57) ABSTRACT

A method for controlling a machine with at least one inverter-operated electric drive unit includes determining the instantaneous mains frequency of the mains supply to the machine and a deviation of the determined mains frequency over a standard frequency of the mains supply, determining a frequency correction value for adjusting the target drive frequency at which the electric motor of the machine is operated by weighting the deviation with a factor k, the factor k being specified dynamically as a function of at least one process variable of the drive load and/or of the operated drive process, and operating the machine at the adjusted target frequency.

10 Claims, 1 Drawing Sheet

(56) References Cited

FOREIGN PATENT DOCUMENTS

DE    10 2016 006 431 A1    11/2017
DE     102016006431 A1 *  11/2017    ................ H02J 3/12
EP      2 911 259 A1     8/2015

OTHER PUBLICATIONS

German-language Written Opinion (PCT/ISA/237) issued in PCT Application No. PCT/EP2019/069402 dated Oct. 24, 2019 (five (5) pages).
German-language Search Report issued in German Application No. 10 2018 212 876.6 dated May 13, 2019 with partial English translation (15 pages).

* cited by examiner

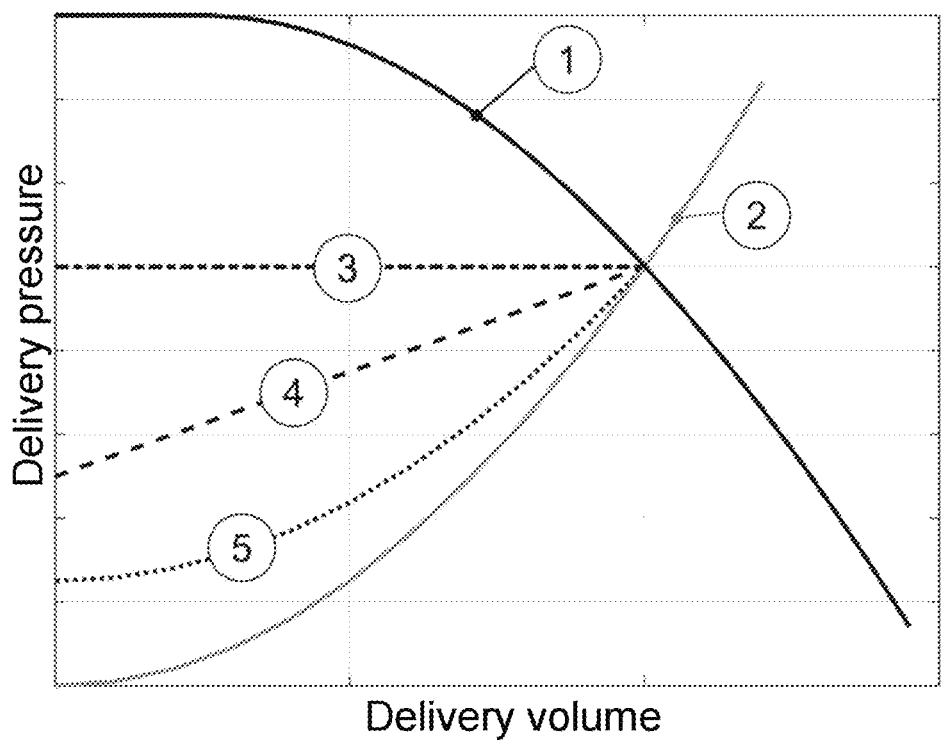

CONTROL METHOD FOR MACHINE WITH INVERTER-OPERATED ELECTRIC DRIVE UNIT

CROSS REFERENCE TO RELATED APPLICATIONS

This application is a national phase of PCT International Application No. PCT/EP2019/069402, filed Jul. 18, 2019, which claims priority under 35 U.S.C. § 119 from German Patent Application No. 10 2018 212 876.6, filed Aug. 2, 2019, the entire disclosures of which are herein expressly incorporated by reference.

BACKGROUND AND SUMMARY OF THE INVENTION

The invention relates to a method for controlling a machine having at least one inverter-operated electric drive unit and to an electric machine having a controller for performing the method.

The electrical energy supply network is stabilised by means of synchronising the frequency of all energy generators. For the most part, large synchronous generators which store rotational energy in their rotational mass are still used nowadays for generating energy. This stored rotational energy is used as an instantaneous reserve so as with the aid of said rotational energy to be able to compensate short term load fluctuations in the supply network. The sum of all rotational masses in the network supply defines the network start-up time. The greater this sum, the more energy can be stored in the rotational masses. Due to the preceding energy transition, the number of electronic power inverters for storing energy increases. The resultant associated reduced number of rotational masses reduces the network start-up time in the network supply, which results in the supply networks being susceptible to load fluctuations.

A comparable effect occurs on the consumer side since the load of all consumers in total is dependent upon the frequency. The consumer's self-regulating effect amounts typically to 1% per Hz. If the network frequency drops as a result of an overload, then the power consumption of the respective consumer also drops. The network is stabilised as a result. However, this self-regulating effect however is reduced by means of inverter-operated rotational consumers since the drive frequency of the load is disconnected by means of the inverter from the network frequency.

Taking into consideration this problem, it is the object of the present invention to propose suitable counter measures on the consumer side that can actively contribute to a stabilisation of the supply network.

The method in accordance with the invention renders it possible in general to use any arbitrary machines that comprise at least one inverter-operated electric drive unit. The electric drive unit is a rotational drive unit, the rotational speed of which can be adjusted by means of an upstream inverter.

In accordance with the invention, it is proposed to monitor or ascertain the instantaneous network frequency of the supply network so as to supply energy to the machine. This can be performed for example by means of the internal electronic system of the machine. Usually, the machine is supplied with the necessary drive energy by means of an external network supply. The network frequency prevailing at the power input can consequently be ascertained directly by the electronic system of the machine or it is calculated preferably estimated indirectly from one or multiple input parameters.

The ascertained instantaneous network frequency is compared against a standard frequency of the network supply known to the machine in order to determine a deviation of the ascertained instantaneous network frequency from the standard frequency. Using the deviation, a correction value is then determined for adjusting the desired drive frequency of the electric drive unit of the machine. The desired drive frequency corresponds to the frequency at which the internal electric motor of the machine is operated or excited for the respective application. The desired drive frequency is determined by means of a rotational speed control procedure that is performed internally in the machine and accordingly generated by means of the internal inverter of the machine. This desired drive frequency is then adjusted in dependence upon the previously determined frequency correction value.

Consequently the desired drive frequency or rotational speed of the electric drive unit and consequently the power consumption of the machine therefore are actively influenced as soon as there is a risk of an unstable network supply, in other words the prevailing network frequency deviates from the actual standard frequency. Ideally, the desired drive frequency is accordingly increased provided that the prevailing network frequency exceeds the standard frequency. If in contrast thereto the prevailing network frequency is below the standard frequency, this can lead to a reduction of the desired drive frequency.

One essential aspect of the invention now resides in the fact that the frequency correction value is ascertained by means of dynamically weighting the deviation. In this case, a weighting factor k is determined dynamically, in other words during the machine operation, in dependence upon at least one special process variable of the machine. This is to ensure that the modification of the desired drive frequency and the thereby intended stabilisation of the network have as little as possible effect on the actual machine process. Fundamentally, the factor k is set in dependence upon a process variable of the load machine and/or of the process being operated. The process variable of the load machine reflects the load being applied to the electric motor or is dependent thereon. A process variable of the machine process being operated characterises the work that is to be performed by the machine, for example possible process variables of the entire system, into which the machine is integrated as a part component, are taken into consideration. Further possible process variables are for example the temperature, drive speed, possible positions, distances, etc.

In accordance with one advantageous embodiment, the machine is a pump, in particular a centrifugal pump. Furthermore, the method is advantageously performed in the case of circulating pumps, in particular heating circulating pumps. The statements below relate essentially to centrifugal pumps, however they also apply without limitation for any machine that is characterised by at least one inverter-operated electric drive unit.

If the method is used to control a centrifugal pump, the factor k can be determined dynamically preferably in dependence upon at least one of the relevant pump process variables: pump motor frequency, pump capacity, delivery volume, delivery pressure, medium temperature or energy input. The process variable energy input corresponds to the heat flow conveyed by the pump and is obtained from the product of the delivery volume and temperature change in the conveyed medium.

It is advantageous if the factor k being used is determined dynamically in a range of 0 to 3, preferably 0 to 2. A wider range, for example from 0 to 10 or 0 to 50 is also conceivable. The factor k can assume for example continuous values in the defined value range. However, discrete values for example two, three or multiple increments in dependence upon at least one process variable are also possible. Advantageously, the upper limit (2, 3, 10, 50) can vary by a specific tolerance range, for example by +/−10% in order thus to obtain an expedient range for the highest value k (in other words for example 1.8 to 2.2 or 2.7 to 3.3 or 9 to 11 or 45 to 55). Specifically, the factor k can in the case of low values of the process variable assume the highest (for example 2, 3, 10, 50) or lowest value (0) with the result that the maximal possible correction is performed on the desired frequency or that the desired frequency is not corrected at all. In the case of average values, the value k assumes for example the value 1 with the result that the desired frequency is amended by the value of the calculated frequency correction. In the case of high values of the process variable, the factor k can likewise assume the highest value (for example 2, 3, 10 or 50) or the lowest value (0).

In general, it is also conceivable to define the factor k by means of a mathematical function that depends on the at least one process variable. Conceivable are for example a linear function, a quadratic function or a parabolic function, a root function, an exponential function, wherein this list is not conclusive.

It is particularly expedient in the case of a centrifugal pump, preferably a circulating pump and in particular a heating circulating pump, if the factor k is defined in dependence upon the prevailing flow rate of the pump. In this case, it has proven to be ideal if the factor k is reduced as the flow rate of the pump increases.

Usually, the distance between the set control curve of a centrifugal pump, preferably a circulating pump, in particular a heating circulating pump, and the system curve, in particular the minimal system curve of the heating system, is primarily in the case of small delivery volumes comparatively large, in other words the control curve lies with sufficient distance above the minimal system curve. The minimal system curve is characterized by the lowest pipeline resistance which the heating system can assume during the operation. This is for example the case when the heating valves are completely open. In such a case, it is possible particularly in the case of a small delivery volume to tolerate a change in the rotational speed of the pump since due to the sufficient distance between the curves an undersupply in the heating system is rather unlikely. In contrast, the risk of an undersupply occurring as a result of a specific rotational speed variation is much greater in the case of large delivery volumes if due to the considerably smaller distance between the curves the control curve can drop below the minimal system curve in the case of a corresponding drop in the rotational speed. Against this background, it has proven to be ideal if in the case of a heating circulating process in the case of small delivery volumes a correction factor k of >1 is selected, whereas as the delivery volume increases the factor is reduced to the value 1.

Furthermore, it is conceivable that the controller of the machine or of the pump detects if it has reached its power limit. In such a case, it is recommended if the machine or the pump fully deactivates the network stabilization, in particular in that the factor k is set to zero in order to prevent the risk of a power loss.

In addition to the delivery volume, in this case the control strategy that is performed by the centrifugal pump, preferably the circulating pump, in particular the heating circulating pump, could also be taken into consideration during the procedure of determining the factor k since the distance with respect to the system curve varies depending upon the control curve. In this case, a constant pressure control mode demonstrates the greatest distance, whereas the distance is further reduced by means of the proportional pressure control mode or even by the energy-saving mode.

The controller of the machine can estimate the instantaneous network frequency for example from a specific measurement parameter which the machine measures at the network input. It is conceivable here for example for the instantaneous network frequency to be derived from the measured input voltage at the input of the electric drive unit of the machine.

The desired drive frequency can be modified or adjusted ideally by adding the frequency correction value to the desired drive frequency that is determined by the internal control procedure.

Moreover, it is particularly advantageous not to provide an upper and/or lower limit for the adjusted desired drive frequency. Accordingly, an upper and/or lower limit value is not provided for the modified desired drive frequency with the result that this is theoretically open downwards and/or upwards in the case of a corresponding deviation of the instantaneous network frequency. Since in practice usually only small deviations of the actual network frequency from the standard frequency are to be considered, it is possible by means of omitting limits of this type to considerably simplify the method. As an alternative, the relationship between the network stabilizing function and the machine function is influenced solely via the factor k.

In addition to the method in accordance with the invention, the present invention moreover relates to a machine having an electric inverter-operated drive unit and a controller for performing the method in accordance with the present invention. The machine is preferably a centrifugal pump, particularly preferred a circulating pump, in particular a heating circulating pump. It goes without saying that the machine therefore comprises at least one electric drive unit, in particular an asynchronous motor, a permanently excited synchronous motor or a synchronous reluctance motor the rotational speed of which can be varied by means of a frequency inverter, in particular by means of the internal rotational speed control procedure. The advantages and characteristics of the machine in accordance with the invention obviously correspond to those of the method in accordance with the invention and for this reason a description is not repeated at this point.

Further advantages and characteristics of the invention are to be further explained with the aid of an exemplary embodiment.

BRIEF DESCRIPTION OF THE DRAWING

The FIGURE schematically illustrates control curves associated with a heating circulating pump in accordance with an embodiment of the present invention.

DETAILED DESCRIPTION

Specifically—without the invention being limited thereto—one exemplary embodiment for a heating circulating pump is proposed which has an internal electric pump drive that is supplied with the necessary energy by means of the regular network alternating voltage. Usually the alternating voltage of a supply network is applied in the case of pumps of this type which operate at a standard frequency of 50 Hz or 60 Hz.

The circulating pump determines an estimated value of the instantaneous network frequency by means of the internal electronic control system. For this purpose, only a measured voltage signal of the electric input side of the drive unit is used. On the basis of this estimated value, described below as $f_{estimate}$, the frequency deviation $\delta_f$ is then calculated as follows:

$$\delta_f = f_{estimate} - f_N$$

wherein $f_N$ in this case represents the standard frequency of the supply network. The calculated deviation $\delta_f$ is then used to generate the necessary correction value $f_{corr}$ for the desired drive frequency $f_{des}$ of the internal rotational speed control of the heating circulating pump. The correction frequency $f_{corr}$ is in this case determined via a factor k from the frequency deviation $\delta_f$. The formula below defines the calculation regulations for this correction frequency value:

$$f_{corr} = k * \delta_f.$$

This correction frequency value $f_{corr}$ is then added to the currently requested desired direct frequency $f_{des}$. The electric drive unit of the circulating pump is then operated at this new frequency $f_{drive}$ or at the corresponding rotational speed.

$$F_{drive} = f_{des} + f_{corr}.$$

In this case, the term $f_{corr}$ is intentionally not limited. Theoretically therefore corr this value can be arbitrarily large. However, in practice this value can remain small as expected since the network frequency always deviates only a little from the network frequency $f_N$.

Moreover, the invention provides for a dynamic adjustment of the correction factor k and in fact in such a manner that the desired stabilization of the network has as little effect as possible on the pumping process itself. For this purpose, the numerical value of the correction factor k is varied in the range from 0 to 2 (or also even higher) in dependence at least on a process variable of the circulating pump.

In this case, the following are to be mentioned as possible process variables:
Pump motor frequency,
Pump capacity,
Pump delivery volume,
Pump delivery pressure,
Pump medium temperature,
Pump energy input or the heat flow conveyed by the pump ($Q*\delta T$).

The influence of these process variables on the factor k is illustrated by way of example with the aid of the delivery volume Q by means of the diagram in the single FIGURE. The FIGURE illustrates the operating range 1 of a heating circulating pump and its system curve 2 in the case of fully opened thermostatic valves. Such a system curve 2 is also described as a minimal system curve.

Also included in the diagram are different control curves for the operation of the heating circulating pump, in other words the rotational speed of the circulating pump is set in dependence upon different control algorithms. In this case, the first control curve 3 represents a constant pressure control mode and the control curve 4 represents a proportional pressure control mode. The control curve 5 represents an "eco-mode" pump control mode during which a further reduction in the rotational speed depending upon requirements is performed in order to save energy.

However, in the case of all three operating modes in accordance with the control curves 3, 4, 5, the distance between each of the control curves 3, 4, 5 and the minimal system curve 2 is the greatest in the case of low flow rates and reduces respectively as the flow rate increases. The probability of an undersupply (if the operating point of the pump drops below the minimal system curve 2) is consequently in the case of a low flow rate less than in the case of a high flow rate. Consequently, it is expedient in the case of a heating circulating process to select a correction factor k>1 in the case of small delivery volumes, whereas in the case of large delivery volumes the factor k is reduced to the value 1.

The method in accordance with the invention and the associated digitalized function in the drive unit, in particular in the pump drive unit, renders it possible to stabilize the network in a purposeful manner, wherein the scope of the network stabilizing function is dynamically adjusted to suit the customer process of the consumer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for controlling a machine having at least one inverter-operated electric drive unit, comprising the steps of:
   determining by the machine an instantaneous network frequency of a network supply of the machine;
   determining a deviation of the instantaneous network frequency with respect to a standard frequency of the network supply;
   determining a factor k dynamically as a function of at least one process variable of a drive load, a drive process or the drive load and the drive process for which the machine is being operated;
   determining a frequency correction value for the adjustment of a desired drive frequency at which an electric motor of the electric drive unit of the machine is operated by weighting the deviation with the factor k;
   applying the frequency correction value to the desired drive frequency to generate a corrected desired drive frequency; and
   operating the electric motor at the corrected desired drive frequency.

2. The method as claimed in claim 1, wherein
   the machine is a centrifugal pump, and
   the factor k is determined in dependence at least upon one variable of the drive process of the centrifugal pump: motor frequency, pump capacity, delivery volume, delivery pressure, medium temperature and energy input.

3. The method as claimed in claim 2, wherein
   the centrifugal pump is a heating circulating pump.

4. The method as claimed in claim 3, wherein
   the factor k is determined in a range from 0 to 50.

5. The method as claimed in one claim 3, wherein
   the factor k is reduced as a flow rate of the pump increases.

6. The method as claimed in claim 3, wherein
   the factor k is reduced as a delivery volume of the pump increases.

7. The method as claimed in claim 1, wherein
   the instantaneous network frequency of the network supply is estimated from a measurement parameter, and the measurement parameter includes a measured voltage signal at the input of the electric drive unit.

8. The method as claimed in claim 1, wherein the corrected desired drive frequency is obtained by adding the frequency correction value to the desired drive frequency.

9. The method as claimed in claim 2, wherein the corrected desired drive frequency is not limited by upper or lower limit values.

10. A machine, comprising:
a centrifugal pump, and
a controller configured to perform the method as claimed in claim 1.

* * * * *